United States Patent [19]

Gaston

[11] Patent Number: 4,594,051
[45] Date of Patent: Jun. 10, 1986

[54] SYSTEM, APPARATUS, AND METHOD FOR DETECTING AND CONTROLLING SURGE IN A TURBO COMPRESSOR

[75] Inventor: John R. Gaston, Allegany, N.Y.

[73] Assignee: Dresser Industries, Inc., Dallas, Tex.

[21] Appl. No.: 609,705

[22] Filed: May 14, 1984

[51] Int. Cl.⁴ .................. F01D 21/12; F04B 49/00; G01K 13/02
[52] U.S. Cl. .................. 415/48; 415/118; 417/32; 417/63; 417/292; 374/10; 374/144; 364/431.02
[58] Field of Search .......... 415/1, 15, 17, 47, 48, 415/49, 118; 417/32, 63, 26, 292; 374/10, 170, 179, 144; 364/557; 60/39.23, 39.29; 364/431.02

[56] References Cited

U.S. PATENT DOCUMENTS

| | | | |
|---|---|---|---|
| 2,875,613 | 3/1959 | Neal | 374/144 X |
| 2,955,745 | 10/1960 | Hunter | 415/47 |
| 2,985,107 | 5/1961 | Anderson | 415/47 |
| 3,291,146 | 12/1966 | Walker | 415/47 X |
| 3,719,071 | 3/1973 | Hohenberg | 415/48 X |
| 4,046,490 | 6/1977 | Rutshtein | 417/28 |
| 4,131,756 | 12/1978 | Smith | 374/144 X |
| 4,399,548 | 8/1983 | Castleberry | 377/16 |
| 4,440,508 | 4/1984 | Haloburdo, Jr. et al. | 374/144 |

FOREIGN PATENT DOCUMENTS

| | | | |
|---|---|---|---|
| 2939534 | 4/1981 | Fed. Rep. of Germany | 415/48 |
| 104005 | 8/1979 | Japan | 415/47 |

OTHER PUBLICATIONS

Dresser Industries, Inc., "Surge Detection System", Dwgs. 466—745-601 and 466-745 (1979).
Dresser Industries, Inc., "Description of Operation—Surge Detection System", Dwgs. 468—249-601; 468-249 (1981).
Dresser Industries, Inc., "Surge Detector, Axial Flow Compressor", Dwgs. 470—464-601; 470-464 (1983).
GHH, "Description of GHH Surge Limiter" (1974).

Primary Examiner—Robert E. Garrett
Assistant Examiner—Joseph M. Pitko
Attorney, Agent, or Firm—Sigalos & Levine

[57] ABSTRACT

A surge detection system for a compressor having a gas inlet and a gas outlet and experiencing rapid temperature changes in said gas inlet during surges, said detector comprising first and second thermocouples having different temperature response times, Tf and Ts respectively, and producing an electrical output proportional to said rapid temperature change occurring during a surge, means for mounting said first and second thermocouples in said compressor gas inlet such that both thermocouples are subject to the same temperature changes, means for electrically coupling said thermocouples to algebraically sum said electrical outputs, Tf−Ts to represent the rapid change in temperature occurring between said thermocouples, and means coupled to said thermocouples for converting said algebraically summed outputs, Tf−Ts, to control signals representing the number, intensity and duration of said surges.

30 Claims, 4 Drawing Figures

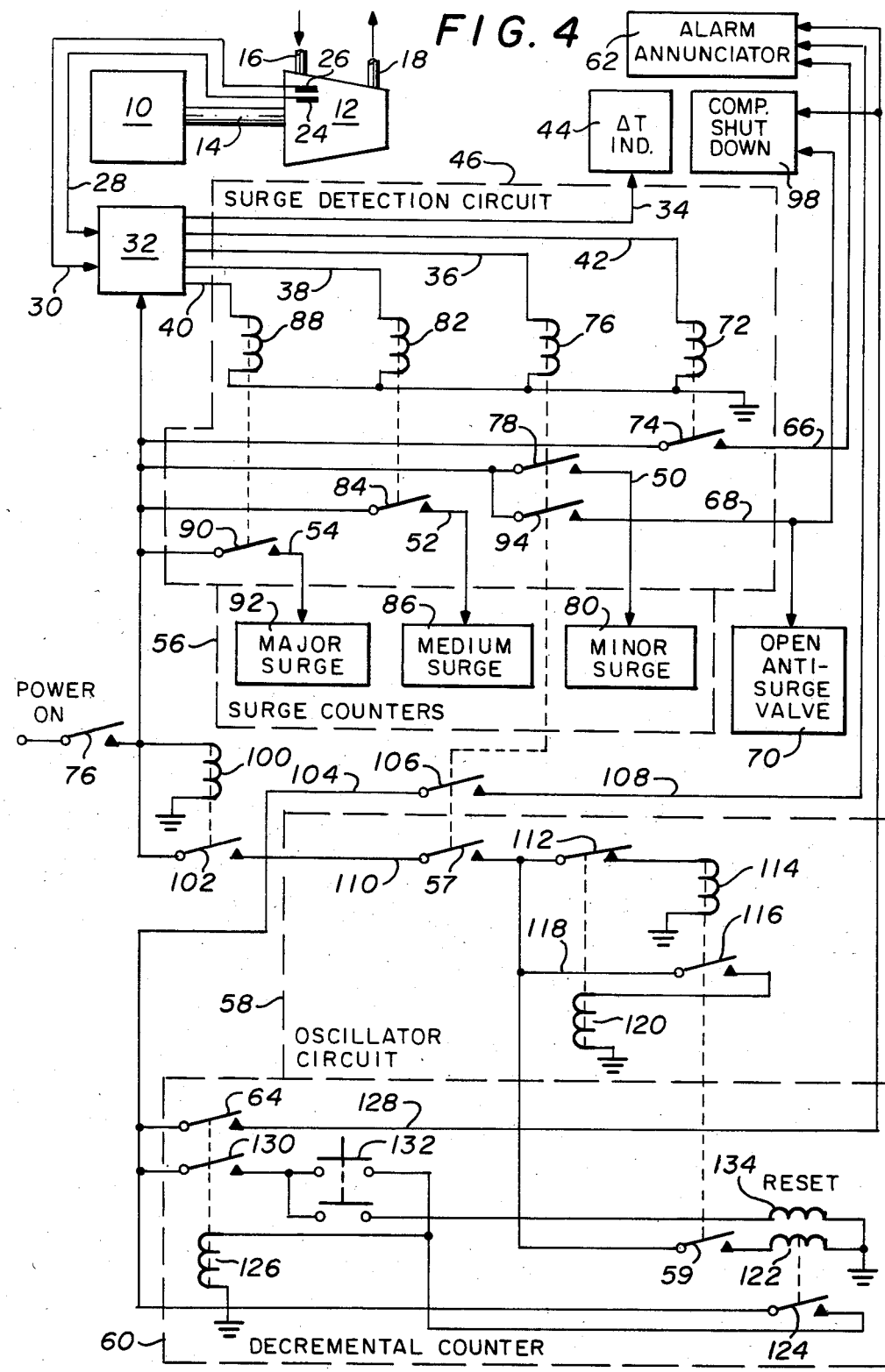

SYSTEM, APPARATUS, AND METHOD FOR DETECTING AND CONTROLLING SURGE IN A TURBO COMPRESSOR

BACKGROUND OF THE INVENTION

The present invention relates generally to detecting surges that occur in rotating compressors and, more particularly, for a method and means to quickly detect surge and generate control signals which are used to prevent serious compressor damage caused by excessive surging by providing warnings and control actions before the individual and cumulative stresses of repetative surge cycles damage the compressor.

Turbo compressors are used to deliver compressed gas into many and varying type processes. These processes impose a resistance to flow. The resistance may be relatively constant, or it may vary considerably during normal or abnormal process operation. An increase in process resistance causes an increase in the compressor discharge pressure. If the resistance becomes excessive, a point is reached where the compressor is not capable of producing the necessary discharge pressure and a momentary flow reversal occurs. This flow reversal is called "surge". It can cause serious compressor damage due to induced vibratory stresses and very high temperatures. During normal operation the discharge gas is hot due to the compression process. When surge occurs the hot gas flows back through the compressor causing the inlet temperature to increase. Work is actually done on the gas during the "surge" flow reversal, so the resultant inlet temperature can increase to a value even higher than the discharge temperature had been just before the flow reversal. This is particularly true of an axial flow type turbo compressor, which also is more susceptible to surge damage. Therefore, the invention is of particular value for axial flow compressors. This phenomenon may be repeated at frequent internals and a high mechanical stress is placed upon the blades and bearings which can cause serious compressor damage. The potentially damaging effect cannot be precisely measured, but is a function of the number, magnitude and duration of the surge cycles.

The main protection against surging is the use of an antisurge control mechanism which, at some limiting point prior to surge, opens bypass valves to vent the compressor discharge to the atmosphere to keep the rate of fluid flow in the compressor at some admissable value. A surge detection system, as in this invention, is used as a backup in case the main protection system fails to prevent surge. Various methods of surge detection were used in the prior art.

In some instances a single temperature sensor such as a thermocouple is located at the compressor intake to detect the sudden temperature rise which accompanies the surge. In such case, the system must be set to operate higher than the highest normal operating temperature in order to detect the abnormal temperature rise. For example, a 150° F. set point would be typical for a maximum normal operating temperature of 100° F. Further, with the single temperature sensor the time to detect surge increases as the operating temperature decreases. For example, an increase of 150° F. would be needed to activate the surge detector when the compressor is operating at 0° F. Such a system would have failed to count medium and mild surges because the change in temperature was less than 150° F.

Other prior art systems use a pressure differential or rate of change in pressure or flow to detect surge. See U.S. Pat. No. 4,046,490. These systems using pressure change as the detector must be set to operate over a rate of change indicative of surge while ignoring normal rates of change. The proper setting cannot be accurately calculated, therefore actual compressor surge tests are necessary to assure correct setting.

As stated earlier, some prior art systems had only one thermocouple in the compressor. Others have one in the compressor and another located to sense gas temperature in the inlet pipe upstream from the compressor. Automatic controls were required to disable the surge detection system when the compressor was shut down. This was necessary to prevent false surge alarms when a compressor thermocouple is heated due to temperature soaking from the hot discharge into the compressor. Still other surge detectors use the vibration of the compressor to detect the occurrence of a surge as disclosed in U.S. Pat. No. 4,399,548. Here the surge must progress to a certain degree of intensity before the vibration is serious enough to be detected.

The present invention provides faster and more reliable surge detection and responds to all surges which cause greater than a 50° F. increase in temperature regardless of the operating temperature at which the surge occurs. Also, the system response is extremely fast and reacts to start corrective action less than ¼ of a second after the onset of a surge. Further, set points for this invention at which signals are developed representing magnitude of surge are not rate-of-change dependent and thus surge tests are not necessary. Also, no automatic controls are required to disable the surge detection system when the compressor is shut down because the heat soaking is not fast enough to produce a change in temperature alarm required by the present case. Further, it provides a warning signal or compressor shut-down based upon the number, intensity and duration of the surges, not just the number of them.

The present invention utilizes two thermocouples located in the compressor inlet such that both thermocouples are subject to the common gas inlet temperature. One of the thermocouples has a rapid response, Tf, to temperature change and the other thermocouple has a slow response, Ts, to temperature change in comparison with the first thermocouple rapid response. These thermocouples are connected electrically in opposed relationship thereby producing a signal output, Tf−Ts, for a given change in temperature. Thus with any rapid temperature change accompanying a surge, a differential signal is produced in proportion to the temperature change whereby the differential signal may be used to detect the number, magnitude and duration of the surges which are occurring. Of course the signal Tf+Ts could be used to indicate a rapid change in termperature. If so, the signal levels would have to change in the control circuitry. Thus the present invention provides the following unique features:

1. Provides a time delay in energizing alarm/counting circuits to prevent false alarm/counts when the power supply is turned on.
2. Provides "fail safe" action in the event of a disconnected or broken wire in the control circuit.
3. Provides an alarm if the thermocouple detection circuit breaks.
4. Counts mild surges.
5. Counts medium surges.
6. Counts major surges.

7. Provides an analog signal for every surge cycle. This signal is indicated and also can be recorded to provide a permanent record of all surges and their relative intensity. The signal peak valve increases with surge intensity.

8. Provides a surge countdown from a predetermined initial setting, with the number of counts per surge varied according to the time period (relative intensity) of each surge cycle.

9. Provides an alarm warning that the compressor internals should be inspected for evidence of damage when the accumulated surge induced stresses reach a predetermined value.

10. Provides a signal to open a discharge vent valve to eliminate the surge condition.

11. Provides a signal to stop the compressor when surge occurs.

12. Provides full time surge detection, i.e. the system is operable throughout startup, and the critical shutdown phase of operation, whereas it was necessary to disable systems utilizing prior art to avoid false surge alarm/counts during startup and shutdown.

SUMMARY OF THE INVENTION

Thus, the present invention relates to a surge detection system for a compressor having a gas inlet and a gas outlet and experiencing rapid temperature changes in said gas inlet during surges, said detector comprising first and second thermocouples having different temperature response times, Tf and Ts respectively, and producing an electrical output proportional to said rapid temperature change occurring during a surge, means for mounting said first and second thermocouples in said compressor gas inlet such that both thermocouples are subject to the same temperature changes, means for electrically coupling said thermocouples to algebraically sum said electrical outputs, Tf and Ts, to represent the rapid change in temperature occurring between said thermocouples, and means coupled to said thermocouples for converting said algebraically summed outputs, Tf and Ts, to control signals representing the number, intensity and duration of said surges.

The invention also relates to a method of detecting surges in a compressor having a gas inlet and a gas outlet and experiencing rapid temperature changes in said gas inlet during surges, said method comprising the steps of mounting first and second thermocouples in said compressor gas inlet such that both thermocouples are subject to the same temperature changes, said first and second thermocouples having different temperature response times, Tf and Ts, and producing an electrical output proportional only to said rapid temperature changes occurring during a surge, means for electrically coupling said thermocouples to algebracially sum said electrical outputs, Tf and Ts, to represent the rapid change in temperature occurring between said thermocouples, and converting said algebracially summed outputs, Tf and Ts, to control signals representing the number, intensity and duration of said surges.

BRIEF DESCRIPTION OF THE DRAWINGS

These and other more detailed objects and advantages of the present invention will be seen in relation to the accompanying drawings in which:

FIG. 4 is a detailed diagrammatic representation of the novel surge detection and control system.

DETAILED DESCRIPTION OF THE DRAWINGS

Figure 1:
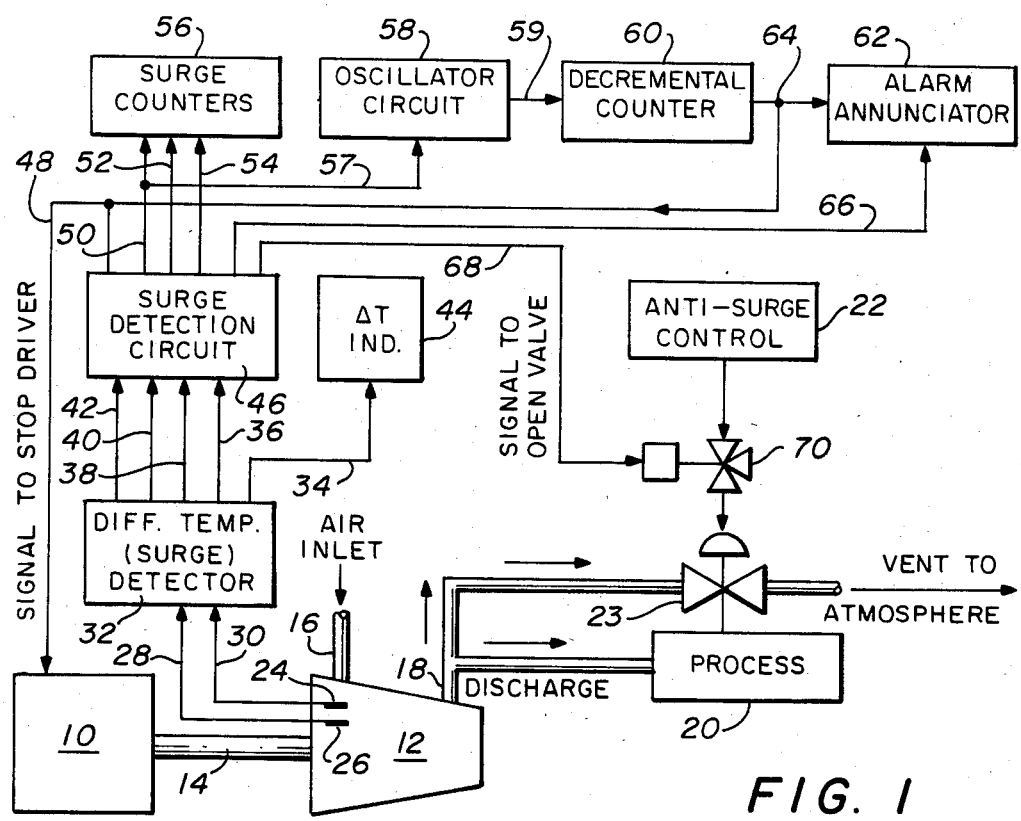
FIG. 1 is a diagrammatic representation of the present invention.

FIG. 1 is a diagrammatic representation of a rotary turbo compressor such as, for example only, an axial flow compressor which utilizes the novel surge detection system forming the present invention. As can be seen in FIG. 1, a drive source 10, which could be any type of electrical or fuel driven motor, provides power to and rotates compressor 12 through a coupling means 14 such as a drive shaft. Compressor 12 has a gas inlet 16 and a discharge port or gas outlet 18 which is coupled to some device 20 for operating a process of any sort which could use the output of compressor 12.

It is well known in the compressor art that compressors are designed to operate under certain well defined stable flow conditions. When the flow becomes unstable due to a flow interruption in the system, compressors will surge. Compressor surge may be defined as a large amplitude, low frequency oscillation of the total annulus-averaged flow through the compressor. It is also well known in the art that each time a compressor surges the compressor blades and bearings are subjected to very high stresses. Excessive surging may eventually weaken the compressor blades to a point that de-blading is possible. Thus, serious compressor damage can be caused by excessive surging. The potentially damaging effect cannot be precisely measured but is a function of the number, magnitude and duration of the surge cycles. Control actions that take place in the present invention are based on these three parameters.

Normally surge is prevented by an anti-surge control device 22 which regulates a valve 23 to recycle part or all of the gas back to the compressor inlet, or vent it to atmosphere as would be done for an air compressor. However, anti-surge controls and related system components are subject to malfunctions which, in turn, can result in serious compressor damage if too many surge cycles occur. Thus redundancy for the anti-surge control device 22 is needed to protect the machine from short-term damage due to sustained surging and to provide a warning when maintenance is needed to prevent serious damage due to the cumulative effects of occasional surges over a relatively long period of time.

Figure 2:
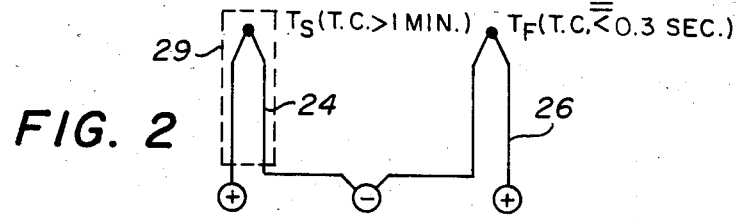
FIG. 2 shows the connection of the two thermocouples which provide a differential temperature detector which produces output signals representing a rapid change in temperature, a broken thermocouple circuit and the magnitude and duration of a surge.

One of the effects of surging is that during any surge cycle the gas temperature in the gas inlet 16 of compressor 12 increases extremely rapidly. However the temperature also varies through a wide range from start-up through extended use of the compressor. Thus there has to be a distinction made between a rapid temperature change and a gradual temperature change taking place in the gas inlet 16 during operation of compressor 12. First and second thermocouples 24 and 26, respectively, are mounted in the gas inlet 16 of compressor 12 where both are subjected to the same temperature. However, one of the thermocouples 26 is of special design and responds very quickly to any temperature change. The other thermocouple 24 is of a standard design and has a relatively slow response to temperature change as compared to the first thermocouple 26. The reason that thermocouple 24 reacts more slowly to a temperature change is because it is encased in a thermowell 29 as shown in FIG. 2 which prevents the heat from reaching the thermocouple element itself quickly. Thus thermocouple 24 is a slow response (Ts) thermocouple while thermocouple 26 is a fast response (Tf) thermocouple. For example, the time constant of the fast thermocouple 26 may be equal to or less than 0.3 second while the time constant of the slow thermocouple 24 may be greater than one minute. The fast thermocouple 26 is made of chromel constantan, type E, 30 gauge wire as manufactured by Omega Engineering Inc. While the slow thermocouple 24 is made of the same type wire except it is 18 gauge. The thermowell 29 is a tapered shank, ¼ inch nominal bore sleeve made of 304 stainless steel manufactured by Ashcroft. These thermocouples 26 and 28 are coupled in opposing electrical relationship as shown in FIG. 2 thereby producing a differential signal level output for a given change in compressor inlet temperature. Since these thermocouples are mounted in the compressor inlet 16 such that both thermocouples 26 and 28 are subject to the same or common temperature change, and since one of the thermocouples responds to that temperature change faster than the other, a differential electrical signal (delta-t) is produced by the thermocouples when a surge occurs because of the rapid temperature rise in the inlet nozzle 16 of compressor 12.

TABLE I

| Temperature °F. | | | Millivolts Gen. | | | Event |
|---|---|---|---|---|---|---|
| Tf | Ts | T | Tf | Ts | Tf-Ts | Represented |
| 0° F. | 50° F. | −50° F. | −1.2 | 0.6 | −1.8 | Broken thermocouple |
| 100° F. | 50° F. | 50° F. | 2.4 | 0.6 | 1.8 | Mild Surge |
| 250° F. | 50° F. | 200° F. | 7.8 | 0.6 | 7.2 | Medium Surge |
| 450° F. | 50° F. | 400° F. | 15.9 | 0.6 | 15.3 | Major Surge |

Table I illustrates the relationship of the temperature detected by the fast responding (Tf) thermocouple 26, the temperature detected by the slow responding (Ts) thermocouple 24, the delta-t, (Tf−Ts), for a given operating ambient temperature of 50° F., and the millivolt signal generated by each of the thermocouple circuits and, since the thermocouples are electrically connected in opposition to each other, the algebraically summed output millivolts (Tf−Ts), and the event represented by each of these conditions. It should be noted that the values given in Table I are with the slow thermocouple (Ts) at the ambient temperature of 50° F. Due to thermocouple nonlinearity, actual delta-t values will vary approximately plus or minus five degrees over the average range of ambient operating temperatures.

The first event represented in Table I is a broken thermocouple. This condition could also occur momentarily during a cold weather start-up of a warm compressor. Prior to start-up, the delta-t indication would be approximately zero since both the fast thermocouple 26 and the slow thermocouple 24 would be at the same temperature of 50° F. The delta-t would then drop rapidly as the compressor begins taking in cold outside air or gas. This could cause, for instance, a delta-t of −50 degrees. This same electrical indication would exist if either thermocouple breaks because the instrument is designed to drive down scale if the thermocouple input circuit is disconnected.

If the temperature in the gas inlet 16 suddenly surged to 100° F. the delta-t would be 50° F. and the difference in the millivolts generated by the fast responding thermocouple 26 as compared to the slow responding thermocouple 24 would be 1.8 millivolts and that signal would represent a mild surge.

Should the temperature in the intake manifold or inlet 16 to compressor 12 suddenly surge to 250° F., the delta-t would be 200° F. and the difference in the millivolts generated by the fast thermocouple 26 and the slow thermocouple 24 would be 7.2 millivolts which would represent a medium surge.

If the temperature in the intake manifold or inlet 16 of compressor 12 should rapidly increase to 450° F., the delta-t would be 400° F. and the difference in millivolts generated by the fast thermocouple 26 and the slow responding thermocouple 24 would be 15.3 millivolts which would represent a major surge taking place in the compressor.

Figure 3:
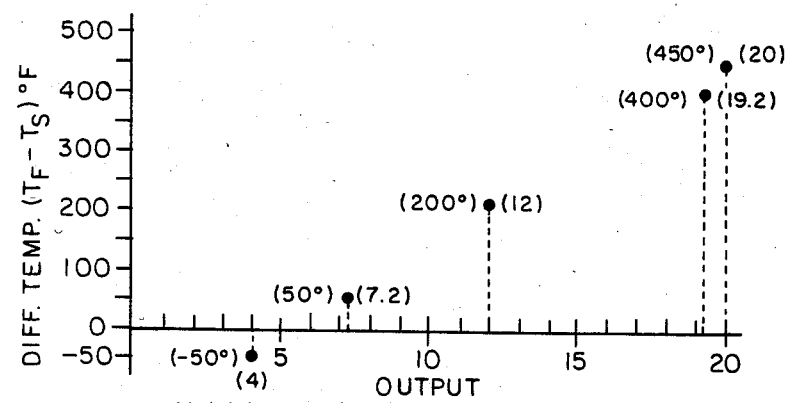
FIG. 3 is a graph illustrating the output current of the surge detector based upon the temperature differential detected by a thermocouple having a fast time constant and a thermocouple having a slow time constant.

These millivolt signal levels generated by the slow responding thermocouple 24 and fast responding thermocouple 26 are coupled on lines 28 and 30, respectively, to a differential temperature detector 32. This unit is a millivolt-to-current converter which receives the millivolt input from the thermocouples 24 and 26 and produces a substantially linear current output as illustrated in FIG. 3. It is comprised of a unit 32A designated as the TC2000A-54 which is manufactured by Dynalco Corporation and which has two set points or signal levels that are adjustable in conjunction with a companion unit 32B designated as TR2-249 which is also manufactured by Dynalco and which has two adjustable set points thus giving a total of four adjustable level outputs. As can be seen in the graph in FIG. 3, if the voltage difference in the signals received on lines 28 and 30 from thermocouples 24 and 26 as shown in FIG. 1 represent a temperature difference of −50° as illustrated in Table I, a 4 milliamp output signal is produced by surge detector 32. In like manner, if a difference temperature of +50° is indicated by the millivolt signals on lines 28 and 30 from thermocouples 24 and 26, surge detector 32 produces a 7.2 milliamp output signal. Also, if the difference in temperature is 200° F. as indicated by the millivolt output signal from thermocouples 24 and 26, the output of surge detector 32 is 12 milliamps. Finally, if the temperature difference represented by the millivolt signals on lines 28 and 30 is 400°, the surge detector 32 produces an output signal of 19.2 milliamps.

Thus differential surge detector 32 will produce an analog signal on line 34 covering the range of 4−20 ma. which may be used for producing a chart or to otherwise make a permanent record of the differential temperatures occuring in the inlet manifold 16 of compressor 12.

The signal output on line 36 may represent a major, medium or minor surge. This occurs for a minor surge by having a 7.2 milliamp signal threshold level set in detector 32 by a comparator and when the input signal from thermocouples 24 and 26 causes a signal to be produced by detector 32 that equals or exceeds that comparator threshold level, an output signal is produced on line 36 representing a minor surge. In like manner, if a second signal threshold level is set, as for instance at 12.0 milliamps by a comparator, an output would be produced on line 38 when a major or medium surge occurs in compressor 12. Also, if a third signal threshold level were set by a comparator at 19.2 milliamps, an output signal would be produced on line 40 when a major surge occurs in compressor 12. Finally, if a fourth signal threshold level is set by a comparator at 4 milliamps or less, a signal would be produced on line 42 indicating a broken or open thermocouple circuit. In such case the output of the surge detector 32 is driven downwards to 4 ma. Each of the signals on lines 34, 36, 38, 40 and 42 can be used in whatever manner desired to indicate and control surge conditions and to insure proper maintenance of the compressor 12 that is being subjected to the surges.

Thus the present invention produces analog and discrete signals representing a broken thermocouple circuit, and minor, medium and major surges in the compressor as represented by a sudden change in temperature in the intake manifold of the compressor. This novel surge detection device provides redundancy for the surge prevention system and the surge is detected by instruments which sense a very rapid increase in temperature in the compressor inlet. As stated previously, two thermocouples, 24 and 26, (signal and reference) are mounted in the compressor 12 inlet nozzle 17. The signal thermocouple 26 has a very fast response time and as identified "Tf". The reference thermocouple 24 has a very slow response time and is referred to as "Ts". The signal thermocouple (Tf) has an exposed tip of very small diameter wire. The reference thermocouple (Ts) has an enclosed tip of large diameter wire and is installed in a thermowell which makes its response even slower. During a surge cycle, the compressor inlet temperature rises and falls very rapidly (1–4 seconds typical). Output from the fast thermocouple 26 (Tf) increases rapidly in response to the temperature increase, but the slow thermocouple 24 (Ts) output changes hardly at all in the short time interval.

The two thermocouples are wired with opposing polarity and therefore the rapid temperature rise appears momentarily as a differential temperature (Tf−Ts) signal. A differential temperature detector 32 produces analog and other output signals which are used for visual indication, surge control and compressor shut down.

The analog output signal from differential surge detector 32 is coupled on line 34 to a delta-t indicator 44 which can be a recorder or other indicator to preserve a record of the difference in temperature occurring between the thermocouple 26 having the fast response and the thermocouple 24 having the slow response.

After it receives the signals on line 36 representing all surges taking place in the compressor, the signals on line 38 representing the medium and major surges taking place in the compressor 12, the signals on line 40 representing the major surges taking place in compressor 12, and the signals on line 42 representing a broken thermocouple, the surge detection circuit 46 generates a plurality of output signals. One of these signals on line 48 is generated when a signal representing all surges appears on line 36. The surge detection circuit 46 couples the signal on line 48 to driver 10 for causing the compressor 12 to shut down whenever any surge is detected. The driver 10 can be deactivated, of course, in any well known means as for instance shutting off the power supply or opening the electrical circuit which is powering the driving means 10.

Surge counters 56 receive the signals from surge detection circuit 46 on lines 50, 52 and 54 and provide a separate counter for receiving the signals on each of those lines thus counting the total number of surges occurring as indicated by the signals on line 50, counting the number of medium and minor surges according to the signals appearing on line 52, and counting the number of major surges according to the signals appearing on line 54.

In addition, whenever a signal appears on line 50 representing all surges, that signal is also coupled through line 57 to an oscillator circuit 58. Thus the oscillator circuit is activated during the duration of the signal representing any surge and thereby generates a plurality of pulses which represents the duration and/or magnitude of each of the surges. These pulses are connected through coupling means 59 to a decremental counter 60 which establishes a maximum threshold of surge duration for a compressor by setting the decrementing counter 60 to a predetermined count whereby the pulses from oscillating circuit 58 decrement counter 60 thus maintaining a cumulative record of the duration, number, and magnitude of the surges being detected by oscillator circuit 58. Assume that a maximum of 75 pulses represents the maximum accumulation of surge stress allowed for compressor 12. This count of 75 is set in decremental counter 60. As each surge is detected by oscillator circuit 58 and pulses are produced according to number, magnitude and duration of the surges, the decremental counter is counting down until 75 pulses have been counted. At that time, the decremental counter 60 produces an output on line 64 which is coupled to an alarm annunciator 62 and/or the compressor shutdown circuits in driver 10 through line 48.

Thus, it can be seen that control action and pulse counting is based on the three parameters of number, intensity and duration of said surges. Therefore, the system protects the compressor from short term damage due to intense surging and yet provides a warning when maintenance is needed to prevent serious damage due to the cumulative effects of occasional minor surges over a relatively long period of time. As has been explained, each surge which produces a delta-t greater than 50° F. is counted. Also, each surge subtracts at least one count from decremental counter 60. The number of counts subtracted from decremental counter 60 for each surge varies depending upon the surge intensity and duration. One count may be removed for a mild surge, but more counts for a larger surge. For example, two or three counts might be subtracted for a surge of medium intensity and four or five counts for a major surge. When the decremental counter decreases to 0, it produces an output signal to warn of maximum danger due to excessive cumulative surging and, if desired, may shut down the compressor. The alarm annunciator 62 generates the warning signal.

The stress produced on the compressor blades increases with surge intensity and duration. Thus, by varying the counts based on surge intensity and duration, the output from counter 60 more truly represents the potential for surge induced blade failure than if only one count was subtracted for each surge regardless of its intensity.

Surge detection circuit 46 may also produce an output signal on line 66 which is coupled to the alarm annunciator 62 to cause an alarm each time a broken thermocouple signal is generated on line 42. Thus, the warning alerts the personnel that there is a problem with the thermocouples and they need to be checked.

Finally, surge detector 46 may produce a signal on line 68 each time a surge signal is generated on line 36 thereby opening control valve 70 to vent the compressor to the atmosphere thus controlling the surge that is taking place at any time. The details of the novel circuit are illustrated in FIG. 4.

As can be seen in FIG. 4, drive source 10, which may be a motor of any type, drives compressor 12 through a coupling means 14 such as by a shaft, for instance. First and second thermocouples 24 and 26 are mounted in the compressor 12 gas inlet 16 so that both thermocouples are subjected to the same temperature environment. As stated earlier, the thermocouples 24 and 26 have a different time constant in response to temperature. The slow acting thermocouple has a time constant greater than one minute while the fast acting thermocouple has a time constant equal to or less than 0.3 second. As stated earlier with respect to FIG. 2, the thermocouple outputs are coupled electrically in opposing relationship so that when the thermocouples are experiencing the same ambient temperature, the output from them is 0. If the inlet temperature rises and falls very rapidly (1-4 seconds typical) the output (Tf) from the fast thermocouple 26 increases rapidly in response to the temperature increase but the slow thermocouple 24 produces an output (Ts) that changes hardly at all in that short time interval. Thus a difference voltage (Tf−Ts) is produced which is coupled on lines 28 and 30 to the surge detector 32. As stated earlier with respect to FIG. 3, surge detector 32 receives the millivolt input and produces a proportional control output of 4 to 20 milliamps DC. As illustrated in FIG. 3, the 4 milliamp output represents a −50° F. differential temperature (Tf−Ts) being produced by thermocouples 24 and 26, the 7.2 milliamp output represents a +50° F. differential temperature (Tf−Ts) between thermocouples 24 and 26, a 12 milliamp output represents a 200° F. temperature differential (Tf−Ts) between thermocouples 24 and 26, and a 19.2 milliamp output represents a 400° F. temperature differential (Tf-Ts) between thermocouples 24 and 26. Those output levels are used to operate a surge detection circuit 46.

As can be seen in FIG. 4, the entire range of 4 to 20 milliamps DC may appear on line 34 as an analog signal which is coupled to delta-t meter 44 which records the difference in temperature occurring between the two thermocouples. This makes a permanent record of the operation available.

In like manner, if the 4 milliamp signal is generated it causes a signal to appear on line 42 which is coupled to relay 72 to de-energize it and cause its switch contact 74 to return to its normally closed position. If the power switch 76 is activated and electrical power is available, that power is coupled through normally closed switch contact 74 and line 66 to an annunciator 62 to indicate that a broken thermocouple exists. As stated previously, this alarm condition being generated by annunciator 62 could also occur momentarily during a cold weather start up of a warm compressor. In that case, the delta-t indication would be approximately 0 prior to start up and would then drop rapidly as the compressor starts taking in cold outside air or gas. If this occurs, the differential temperature (Tf−Ts) may become a −50° F. and if that occurs a signal would be caused to appear on line 42 from surge detector 32 to de-energize relay 72 and return its normally closed switch contact 74 to its closed position thus coupling power to the annunciator which would give a warning. If this occurs, several minutes should be allowed to pass so the delta-t indication may increase somewhat above the −50° F. differential temperature and then the alarm could be reset in any well known manner.

In like manner, if surge detector 32 receives a +50° F. temperature differential from thermocouples 24 and 26, it causes an output signal to be produced on line 36 representing 7.2 milliamps which de-energizes relay 76 and causes a first switch contact 78 to return to its normally closed position to couple power on line 50 to a minor surge counter 80. This means then that every time a minor surge occurs, which, as established in Table I, occurs at a +50° F. temperature differential, counter 80 records that surge because de-energized relay 76 closes contact 78. Thus, counter 80 keeps track of the total number of surges occurring. It is obvious that any signal exceeding 7.2 milliamps, for instance the 12 milliamps representing a medium surge and the 19.2 milliamps representing a major surge, would also de-energize relay coil 76 thus closing contact 78 and coupling a count to surge counter 80. This means that surge counter 80 records not only the minor surges but also the medium and the major surges.

If the thermocouples 24 and 26 develop a differential temperature of 200° F., the 12 milliamp signal causes a signal to be generated on line 38 thus de-energizing relay coil 82. When coil 82 is de-energized, it returns its switch 84 to its normally closed position which couples power on line 52 to medium surge counter 86. This means that although that same surge was counted by the minor surge counter 80, the medium surge is also counted on medium surge counter 86.

Finally, in like manner, if the thermocouples 24 and 26 produce a temperature differential of 400° F., the 19.2 milliamps signal developed by surge detector 32 on line 40 causes relay 88 to be de-energized which returns its contact 90 to its normally closed position and couples a signal on line 54 to major surge counter 92. It is also evident that the medium surge counter 86 will also be activated by a major surge. Thus, minor surge counter 80 records all surges, medium surge counter 86 records both major and medium surges, and major surge counter 92 records only the number of major surges. As an example only, if minor surge 80 recorded 50 surges, medium surge counter 86 recorded 10 surges, and major surge counter 92 recorded 2 surges, that would indicate that 2 major surges occurred, 8 medium surges occurred and 40 minor surges occurred.

It will be noted that all relays 72, 76, 82 and 88 have normally closed contacts. Thus, the respective contacts are held in the open position until a signal dictates that a particular relay be de-energized to close its contact. In this way, any broken wires would deenergize an affected relay and cause a warning signal to be generated.

As indicated earlier, although the compressor 12 has associated with it anti-surge controls 22 which can open valves 23 (in FIG. 1) to vent the compressor discharge to the atmosphere in an effort to control surges, it is not unknown for these anti-surge controls to malfunction. In that event, serious harm could come to the compressor if the surge isn't alleviated. For that reason, if desired, a second contact 94 may be coupled to relay coil 76 so that each time a surge occurs and relay coil 76 is de-energized, contact 94 would return to its normally closed position thus coupling power to anti-surge valve 70 which would cause the output of compressor 22 to be vented to the atmosphere and to shut down control 98 thereby protecting the compressor 12. Thus, the anti-surge control system 22 is made redundant by this backup system.

As stated earlier, the potentially damaging effect to a compressor caused by surge cannot be precisely measured but it is a function of the number, magnitude and duration of surge cycles in combination. Thus it is obvious that after being subjected to a predetermined number, magnitude and duration of surges, the compressor may be sufficiently damaged that it ought to be inspected and/or parts replaced. However, it is equally true that a few surges of major intensity may cause as much or more damage than many surges of minor intensity. Thus, not only the number of surges occurring, but the intensity of these surges ought to be considered. Further, a few surges having a long duration may be considerably more damaging than many medium or minor surges of shorter duration. Thus, the time duration of the surge is also important to consider. The present system protects the compressor from short term damage due to intense or surging and yet provides warning when maintenance is needed to prevent serious damage due to the cumulative effects of occasional surges over a relatively long period of time.

The stress measurement circuitry comprises an oscillator circuit 58 and a decremental counter circuit 60. When the power switch 76 is first activated, power is coupled to the upper portion of the circuit in FIG. 4 immediately but is coupled to the stress measurement circuitry 58 and 60 through the action of relay coil 100 which has a 10 second delay before switch 102 closes. This gives time for all of the signal generating circuits in the upper portion of FIG. 4 to stabilize before the measurement circuit is coupled to them.

When power switch 102 closes thus applying power to the stress measurement circuits, the power is coupled on line 104 to a switch 106 which is activated by relay coil 76 in surge detection circuit 46. It will be recalled that relay coil 76 is de-energized when either a minor, medium or major surge occurs. This means that switch 106 returns to its normally closed position for each of those surges and couples a signal on line 108 to an annunciator 62 to provide a warning signal that a surge has occurred.

In addition, the power from switch 102 is coupled on line 110 to the oscillator circuit 58 and in particular to switch 57 therein. It will be noted that switch 57 is also a contact which is operated by relay coil 76. Thus, every time a surge occurs, whether it is a minor, medium or major surge, switch 57 closes supplying power through normally closed switch 112 to relay coil 114 thus activating coil 114. When relay coil 114 is energized, it closes normally open switch 116 thus coupling power on line 118 to relay 120 thus energizing relay 120. When relay 120 is energized it opens switch 112 thus removing the power from relay 114. When relay 114 is de-energized it opens switch 116 which de-energizes relay 120. When relay 120 is de-energized it closes contact 112 thus coupling power back to relay 114 and the cycle starts over. Thus it can be seen that relays 114 and 120 form a multivibrator by alternately opening and closing switches 112 and 116 so long as switch 57 is in the closed position caused by relay coil 76. This relay 76 thus accounts for both intensity and duration of a surge. In other words, if a small surge or minor surge de-energizes relay 76 and closes contact 57, if that minor surge is of extended duration, the oscillator circuit 58 will produce a series of output pulses by relay 114 alternately opening and closing another switch contact 59. The opening and closing of contact 59 decrements counter 122 which has a predetermined count stored therein. For instance, it may be 75. This count is determined by the compressor manufacturer who decides when the stress caused by surge has so weakened the compressor that it should be inspected. As long as the minor surge exists, switch 57 is closed and oscillator circuit 58 is opening and closing contact 59 thus decrementing counter 122.

In like manner, if a major surge appears, relay coil 76 also closes switch contact 57 and because the surge is a major one it will last for a greater length of time than the normal minor surge and thus oscillator circuit 58 will produce several pulses by opening and closing switch 59 to decrement counter 122. Thus, not only is the number of the surges being accounted for by switch 57 closing each time a surge of any magnitude occurs, but the oscillator circuit 58 produces more or less pulses depending upon either the magnitude or duration of the surge thereby taking into account both magnitude and duration of each surge.

When decremental counter relay 122 has counted 75 counts, it closes normally open contact 124 which couples the power supply to relay coil 126 to energize it. When relay 126 is energized, it closes contact 64 which couples power on line 128 to annunciator 62 as well as to the compressor shutdown circuit 98.

Thus, an output signal is generated to warn of maximum danger due to excessive surging and the compressor is shut down. The warning indicates that maintenance is needed to prevent serious damage to the compressor due to the cumulative effects of occasional surges over a relatively long period of time. Therefore, by varying the number of counts being decremented from counter 122 based on the number of surges, the surge intensity and the duration of the surge, the warning signal produced by the closing of switch 64 of relay 126 more truly represents the potential for surge induced blade failure than if only one count was subtracted for each surge regardless of its intensity or duration.

Also, when relay 126 is energized, it closes switch contact 130 which couples power to a reset switch 132. After the proper maintenance has been performed and it is desired to start the compressor again, reset button 132 is depressed thus coupling power to reset coil 134 which resets decremental counter 122 to the 75 count and opens the switch contact 124. At the same time, it continues to maintain power on relay 126 even though contact 124 has now opened. When reset button 132 is released, the power is removed from relay coil 126 which opens contacts 64 and 130 thus removing the signal to annunciator 62 and the computer shutdown circuit 98 and also removing the power from the push button switch 132. The unit is thus reset and ready to begin operation anew.

Thus there has been disclosed a surge detection system which not only provides redundancy for the antisurge control system, but also provides a warning against short term damage due to sustained surging and provides a warning when maintenance is needed to prevent serious damage due to the cumulative effects of occasional surges over a relatively long period of time. The novel invention comprises the use of two thermocouples having different temperature response times mounted in a common area in the air intake section of the compressor whereby a sudden change in temperature which accompanies a surge causes a differential voltage to be produced by the thermocouples and this voltage is used to develop threshold levels to recognize minor, medium and major surges, as well as a warning when the thermocouple circuit is broken. The novel circuit also includes circuitry for generating counts based on surge intensity, magnitude and number to warn of surge induced blade failure potential after a predetermined number of counts have been generated.

While the invention has been described in connection with a preferred embodiment, it is not intended to limit the scope of the invention to the particular form set forth but, on the contrary, it is intended to cover such alternatives, modifications, and equivalents as may be included within the spirit and scope of the invention as defined by the appended claims.

I claim:

1. A surge detection system for a compressor having a gas inlet and a gas outlet and experiencing rapid temperature changes in said gas inlet during surges, said detector comprising:
   a. first and second thermocouples having different temperature response times, Tf and Ts respectively, and producing an electrical output proportional to said rapid temperature change occurring during a surge,
   b. means for mounting said first and second thermocouples in said compressor gas inlet such that both thermocouples are subject to the same temperature changes,
   c. means for electrically coupling said thermocouples to algebraically sum said electrical outputs to represent the rapid change in temperature occurring between said thermocouples, and
   d. means coupled to said thermocouples for converting said algebraically summed outputs to control signals representing the number, intensity and duration of said surges.

2. A surge detection system as in claim 1 wherein said converting means includes:
   a. means for generating a first signal representing any major, medium, or minor surge equal to or greater than a predetermined level of intensity,
   b. means for generating a second signal representing major and medium surges equal to or great than a second predetermined level of intensity, and
   c. means for generating a third signal representing major surges equal to or greater than a third predetermined level of intensity.

3. A surge detection system as in claim 2 further including first counter means coupled to said first signal generating means for counting the total number of said major, medium and minor surges occurring.

4. A surge detection circuit as in claim 3 further including:
   a. second counter means coupled to said third signal generating means for counting the number of major surges and
   b. third counter means coupled to said second signal generating means for counting the number of medium and major surges.

5. A surge detection means as in claim 2 further including:
   a. means for producing an output count representing the duration and intensity of each of said surges,
   b. means coupled to said output count producing means for maintaining a count representing cumulative duration and intensity of said surges,
   c. means for establishing a count representing a maximum threshold of surge duration and intensity for a compressor, and
   d. means coupled to said cumulative duration count maintaining means and said threshold count establishing means for generating a control signal if said cumulative surge duration and intensity count equals said maximum threshold count.

6. A surge detection system as in claim 5 wherein said means for producing a count representing the duration and intensity of each surge comprises:
   a. an oscillator circuit, and
   b. means coupled to said oscillator circuit and said first signal generating means for activating said oscillator circuit during the duration of said first signal thereby generating a plurality of oscillator pulses which represent the duration and intensity of each of said surges.

7. A surge detection system as in claim 6 wherein said means for maintaining a count representing cumulative surge duration and intensity comprises:
   a. a counter, and
   b. means coupling said oscillator pulses to said counter for accumulating said oscillator pulses representing duration and intensity of each of said surges.

8. A surge detection system as in claim 7 wherein said counter is a decrementing counter whereby said maximum threshold of surge duration and intensity for a compressor may be established by setting said decrementing counter to a predetermined count whereby when said cumulative oscillator pulses decrement said counter said predetermined count, said control signal is produced.

9. A surge detection circuit as in claim 8 further including:
   a. a compressor shutdown circuit, and
   b. means coupling said control signal to said shutdown circuit whereby said compressor is automatically shutdown whenever said cumulative oscillator pulses equal said predetermined count establishing said maximum surge duration and intensity threshold.

10. A surge detection system as in claim 8 further including:
    a. an annunciator for generating a warning signal, and
    b. means coupling said control signal to said annunciator whereby a warning signal is generated whenever said cumulative oscillator pulses equal said predetermined count establishing said maximum surge duration and intensity threshold.

11. A surge detection system as in claim 2 further including:
    a. means for shutting down said compressor, and
    b. means coupled to said first signal generating means and said compressor shutdown means for causing said compressor to shut down when said first signal representing a minor, medium or major surge is generated.

12. A surge detection system as in claim 2 further including:
    a. an annunciator for generating warning signals, and
    b. means coupled to said first signal generating means representing any surge and to said annunciator whereby, when any surge occurs, said annunciator generates a warning signal.

13. A surge detection system as in claim 2 further including:
    a. an anti-surge valve which can be opened to vent said compressor output to atmosphere to control surges, and
    b. means coupled to said first signal generating means representing any surge and to said anti-surge valve whereby said anti-surge valve is opened when any surge occurs thereby controlling said surge.

14. A surge detector as in claim 1 further including:
   a. means in said converting means for generating an alarm signal when a thermocouple lead is broken,
   b. an annunciator for generating warning signals, and
   c. means coupling said alarm signal to said annunciator thereby generating a warning signal when said thermocouple lead is broken.

15. A method of detecting surges in a compressor having a gas inlet and a gas outlet and experiencing rapid temperature changes in said gas inlet during surges, said method comprising the steps of:
   a. mounting first and second thermocouples in said compressor gas inlet such that both thermocouples are subject to the same temperature changes, said first and second thermocouples having different temperature response times, Tf and Ts, and producing an electrical output proportional only to said rapid temperature changes occurring during a surge,
   b. electrically coupling said thermocouples to algebracially sum said electrical outputs to represent the rapid change in temperature occurring between said thermocouples, and
   c. converting said algebracially summed outputs to control signals representing the number, intensity and duration of said surges.

16. A method as in claim 15 further including the steps of:
   a. generating a first signal representing any major, medium or minor surge equal to or greater than a first predetermined level of intensity,
   b. generating a second signal representing major and medium surges equal to or greater than a second predetermined level of intensity, and
   c. generating a third signal representing major surges equal to or greater than a third predetermined level of intensity.

17. A method as in claim 16 further including the step of coupling a first counter means to said first signal generating means for counting the total number of said major, medium and minor surges occurring.

18. A method as in claim 17 further including steps of:
   a. coupling a second counter means to said third signal generating means for counting the number of major surges, and
   b. coupling third counter means to said second signal generating means for counting the number of medium and major surges.

19. A method of surge detection as in claim 16 further including the steps of:
   a. producing an output count representing the duration and intensity of each of said surges,
   b. maintaining a count representing cumulative duration of said surges,
   c. establishing a maximum threshold of surge duration and intensity for a compressor and
   d. generating a control signal when said cumulative surge duration and intensity count equals said maximum duration and intensity threshold.

20. A method as in claim 19 wherein the step of producing a count representing the duration and intensity of each surge comprises:
   a. providing a source of oscillator pulses,
   b. activating said oscillator pulse source during the duration of said first signal thereby generating a plurality of pulses which represent the duration and intensity of each of said surges.

21. A method as in claim 20 wherein the step of producing an output count representing cumulative surge duration and intensity comprises the steps of:
   a. establishing a counter, and
   b. coupling said oscillator pulses to said counter for accumulating said oscillator pulses.

22. A method as in claim 21 including the steps of:
   a. setting said counter to a predetermined count representing a maximum surge duration and intensity threshold, and
   b. decrementing said counter with said oscillator pulses whereby when said counter has been decremented the total number of counts stored therein, a control signal is produced representing that maintenance is required on said compressor unit.

23. A method as in claim 22 further comprising the steps of:
   a. providing circuit means for shutting down said compressor operation, and
   b. coupling said control signal to said shutdown circuit whereby said compressor is automatically shut down whenever said oscillator pulses cumulatively equal said predetermined count establishing said maximum surge duration and intensity threshold.

24. A method as in claim 22 further including the steps of:
   a. providing means for generating a warning signal, and
   b. coupling said control signal to said warning signal generating means whereby a warning signal is generated whenever said cumulative oscillator pulses equal said predetermined count establishing said maximum surge duration and intensity threshold.

25. A method as in claim 16 further including the steps of:
   a. providing means for shutting down said compressor operation, and
   b. generating a signal to compressor shut down means to cause said compressor to shut down when said first signal representing a major, medium or minor surge is generated.

26. A method as in claim 16 further including the steps of:
   a. generating warning signals through an annunciator, and
   b. coupling said first signal generating means output representing any surge to said annunciator whereby when any surge occurs said annunciator generates a warning signal.

27. A method as in claim 16 further including the steps of:
   a. providing an anti-surge valve which can be opened to recycle gas or vent said compressor output to atmosphere to control surges, and
   b. coupling the output of said first signal generating means representing any surge to said anti-surge valve whereby said anti-surge valve is opened when anti-surge occurs thereby controlling said surge.

28. A method as in claim 15 further including the steps of:
   a. generating an alarm signal in said converting means when a thermocouple lead is broken,
   b. providing annunciator means for generating a warning signal, and c. coupling said alarm signal to said annunciator thereby generating a warning signal when said thermocouple lead is broken.

29. A method of detecting surges as in claim 15 further including the steps of:

a. establishing a predetermined maximum level of surging based upon said number, intensity and duration of said surges, and b. generating a warning signal when said predetermined maximum level of surging is reached.

30. A method of detecting surges as in claim 29 further including the step of generating a compressor shutdown signal when said predetermined maximum level of surging is reached.

* * * * *